US012699432B2

(12) United States Patent
Matturi et al.

(10) Patent No.: US 12,699,432 B2
(45) Date of Patent: Aug. 4, 2026

(54) CLOCK PULSE MANAGEMENT TO REDUCE PEAK POWER LEVELS

(71) Applicant: Micron Technology, Inc., Boise, ID (US)

(72) Inventors: Venkata Kiran Kumar Matturi, Milpitas, CA (US); Sharath Chandra Ambula, Nizampet (IN); Niraimathi N S, Hitech City (IN)

(73) Assignee: Micron Technology, Inc., Boise, ID (US)

( * ) Notice: Subject to any disclaimer, the term of this patent is extended or adjusted under 35 U.S.C. 154(b) by 118 days.

(21) Appl. No.: 18/536,694

(22) Filed: Dec. 12, 2023

(65) Prior Publication Data

US 2024/0231460 A1 Jul. 11, 2024

Related U.S. Application Data

(60) Provisional application No. 63/438,101, filed on Jan. 10, 2023.

(51) Int. Cl.
*G06F 1/10* (2006.01)
*G06F 1/28* (2006.01)
(52) U.S. Cl.
CPC . *G06F 1/28* (2013.01); *G06F 1/10* (2013.01)
(58) Field of Classification Search
CPC ........................................................ G06F 1/10
See application file for complete search history.

(56) References Cited

U.S. PATENT DOCUMENTS

| | | | |
|---|---|---|---|
| 11,709,522 B1* | 7/2023 | Turullols | G06F 1/3206 |
| | | | 713/340 |
| 2008/0290847 A1* | 11/2008 | Mahrla | G06F 1/26 |
| | | | 323/234 |
| 2009/0164827 A1* | 6/2009 | Komninakis | H03L 7/00 |
| | | | 713/500 |
| 2011/0248764 A1* | 10/2011 | Das | H03K 21/38 |
| | | | 327/299 |
| 2014/0025855 A1* | 1/2014 | Fujita | G06F 11/3027 |
| | | | 710/118 |
| 2014/0115361 A1* | 4/2014 | Martin | G06F 1/28 |
| | | | 713/322 |
| 2015/0179248 A1* | 6/2015 | Patil | G06F 5/065 |
| | | | 365/233.1 |
| 2015/0355671 A1* | 12/2015 | Coutts | G06F 1/206 |
| | | | 713/503 |
| 2017/0038789 A1* | 2/2017 | Pal | G06F 1/08 |
| 2018/0018118 A1* | 1/2018 | Raghava | G06F 1/324 |
| 2023/0031415 A1* | 2/2023 | Rajwan | G06F 11/3058 |

* cited by examiner

*Primary Examiner* — Phil K Nguyen
(74) *Attorney, Agent, or Firm* — Lowenstein Sandler LLP

(57) ABSTRACT

Information associated with a power consumption level of a set of components of a controller of a memory device is identified. A determination is made whether the information associated with the power consumption level satisfies one or more conditions. In response to the one or more conditions being satisfied, swallowing one or more clock pulses of a clock signal transmitted to at least one component of the set of components of the controller are swallowed.

11 Claims, 11 Drawing Sheets

Figure 3:
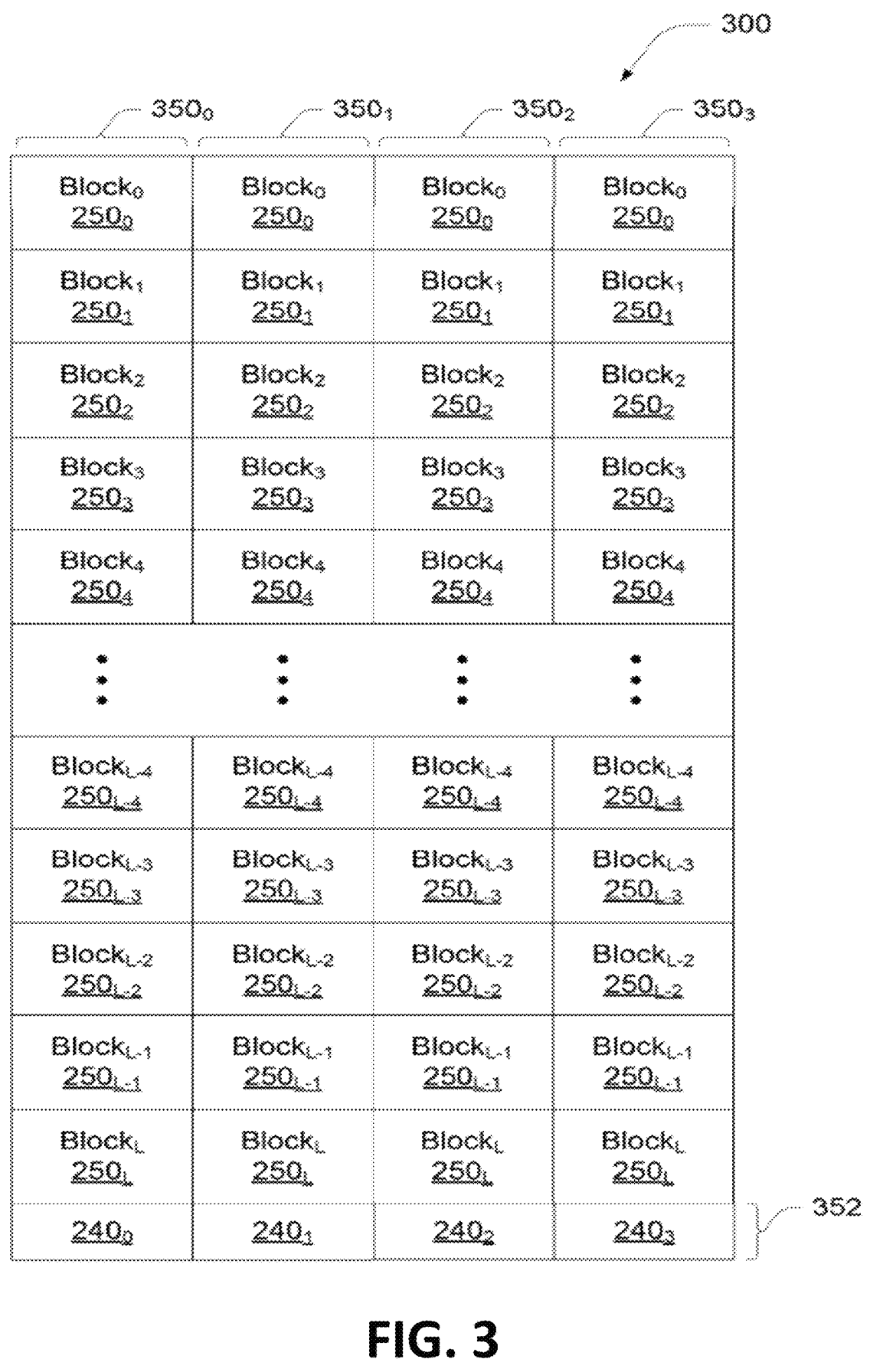

| $350_0$ | $350_1$ | $350_2$ | $350_3$ |
|---|---|---|---|
| Block$_0$ 250$_0$ | Block$_0$ 250$_0$ | Block$_0$ 250$_0$ | Block$_0$ 250$_0$ |
| Block$_1$ 250$_1$ | Block$_1$ 250$_1$ | Block$_1$ 250$_1$ | Block$_1$ 250$_1$ |
| Block$_2$ 250$_2$ | Block$_2$ 250$_2$ | Block$_2$ 250$_2$ | Block$_2$ 250$_2$ |
| Block$_3$ 250$_3$ | Block$_3$ 250$_3$ | Block$_3$ 250$_3$ | Block$_3$ 250$_3$ |
| Block$_4$ 250$_4$ | Block$_4$ 250$_4$ | Block$_4$ 250$_4$ | Block$_4$ 250$_4$ |
| ⋮ | ⋮ | ⋮ | ⋮ |
| Block$_{L-4}$ 250$_{L-4}$ | Block$_{L-4}$ 250$_{L-4}$ | Block$_{L-4}$ 250$_{L-4}$ | Block$_{L-4}$ 250$_{L-4}$ |
| Block$_{L-3}$ 250$_{L-3}$ | Block$_{L-3}$ 250$_{L-3}$ | Block$_{L-3}$ 250$_{L-3}$ | Block$_{L-3}$ 250$_{L-3}$ |
| Block$_{L-2}$ 250$_{L-2}$ | Block$_{L-2}$ 250$_{L-2}$ | Block$_{L-2}$ 250$_{L-2}$ | Block$_{L-2}$ 250$_{L-2}$ |
| Block$_{L-1}$ 250$_{L-1}$ | Block$_{L-1}$ 250$_{L-1}$ | Block$_{L-1}$ 250$_{L-1}$ | Block$_{L-1}$ 250$_{L-1}$ |
| Block$_L$ 250$_L$ | Block$_L$ 250$_L$ | Block$_L$ 250$_L$ | Block$_L$ 250$_L$ |
| 240$_0$ | 240$_1$ | 240$_2$ | 240$_3$ |

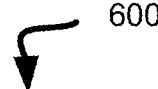 600

Identify information associated with a power consumption level of a set of components of a memory sub-system controller of a memory sub-system
610

Determine whether the information associated with the power consumption level satisfies one or more conditions
620

In response to the one or more conditions being satisfied, swallowing one or more clock pulses of a clock signal transmitted to at least one component of the set of components of the memory sub-system controller
630

CLOCK PULSE MANAGEMENT TO REDUCE PEAK POWER LEVELS

CROSS-REFERENCE TO RELATED APPLICATION

This application claims the benefit of U.S. Provisional Application No. 63/438,101, filed Jan. 10, 2023, the entirety of which is incorporated herein by reference.

TECHNICAL FIELD

Embodiments of the disclosure relate generally to memory sub-systems, and more specifically, relate to managing clock pulses to reduce peak power levels in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2A-2D are schematics of portions of an array of memory cells as could be used in a memory of the type described with reference to FIG. 1B, in accordance with one or more embodiments of the present disclosure.

FIG. 3 is a block schematic of a portion of an array of memory cells as could be used in a memory of the type described with reference to FIG. 1B, in accordance with one or more embodiments of the present disclosure.

FIG. 6 is a flow diagram of an example method to manage clock pulses of a clock signal transmitted to a set of components of a local media controller to reduce a peak power level, in accordance with one or more embodiments of the present disclosure.

DETAILED DESCRIPTION

Figure 1A:
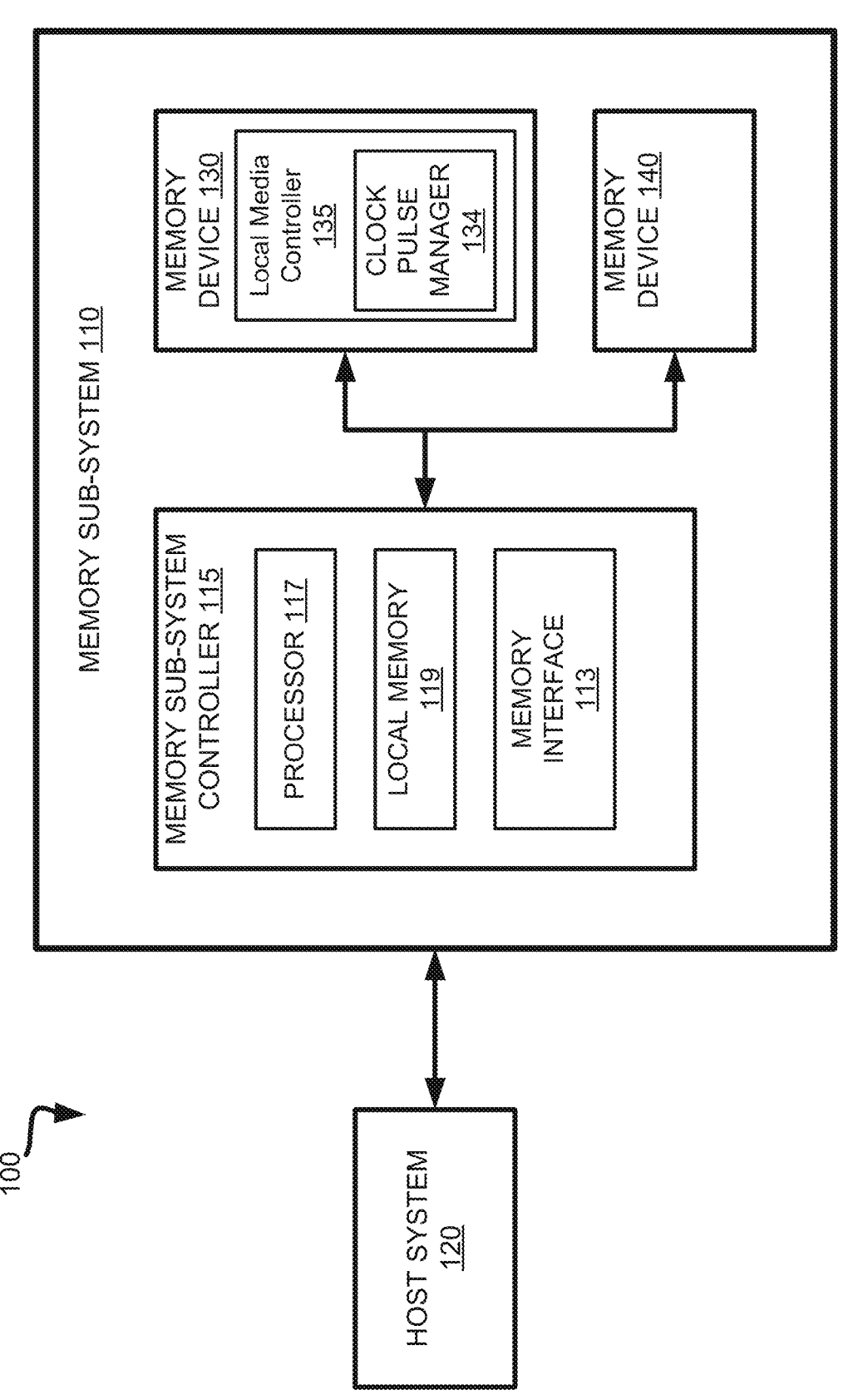
FIG. 1A illustrates an example computing system that includes a memory sub-system, in accordance with one or more embodiments of the present disclosure.

Aspects of the present disclosure are directed to managing a frequency of a clock signal provided to one or more components of a local media controller by selectively swallowing or dropping one or more clock pulses to reduce an overall power consumption level of the set of components of the local media controller of a memory sub-system. A memory sub-system can be a storage device, a memory module, or a combination of a storage device and memory module. Examples of storage devices and memory modules are described below in conjunction with FIGS. 1A-1B. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIGS. 1A-1B. A non-volatile memory device is a package of one or more dies. Each die includes one or more planes. For some types of non-volatile memory devices (e.g., NAND devices), each plane includes a set of physical blocks. Each block consists of a set of pages. Each page includes a set of memory cells. A memory cell is an electronic circuit that stores information. Depending on the memory cell type, a memory cell can store one or more bits of binary information, and has various logic states that correlate to the number of bits being stored. The logic states can be represented by binary values, such as "0" and "1", or combinations of such values.

A memory device (e.g., a memory die) can include memory cells arranged in a two-dimensional or a three-dimensional grid. The memory cells are formed onto a silicon wafer in an array of columns and rows. The memory cells are joined by wordlines, which are conducting lines electrically connected to the control gates of the memory cells, and bitlines, which are conducting lines electrically connected to the drain electrodes of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane.

Some memory devices can be three-dimensional (3D) memory devices (e.g., 3D NAND devices). For example, a 3D memory device can include memory cells that are placed between sets of layers including a pillar (e.g., polysilicon pillar), a tunnel oxide layer, a charge trap (CT) layer, and a dielectric (e.g., oxide) layer. A 3D memory device can have a "top deck" corresponding to a first side and a "bottom deck" corresponding to a second side. Without loss of generality, the first side can be a drain side and the second side can be a source side. For example, a 3D memory device can be a 3D replacement gate memory device having a replacement gate structure using wordline stacking.

One or more memory access operations can be performed with respect to the memory cells of the memory device. In certain memory sub-systems, the local media controller receives a request to perform a memory access operation from a memory sub-system controller. The local media controller can include multiple different components (e.g., controller components) that each perform various functionality relating to the operation of the local media controller. For example, the local media controller can include one or more physical interconnect components (e.g., a physical interconnect to the host system), one or more core processing device components, one or more memory components (e.g., static random access memory, such as cache memory), one or more flash translation layer (FTL) components, and one or more error correction components, etc. Furthermore, the memory sub-system includes an interface (i.e., a controller component) between the local media controller to the one or more memory devices to enable the transmission of inputs and outputs and the datapath between the local media controller and the one or more memory devices.

The controller components and an interface between the controller and one or more memory devices (herein the "memory device interface") may be coupled to a voltage source via a common power rail. The voltage source provides voltage to individually power each of the controller components to perform the respective functionality associated with the execution of a memory access operation (e.g., a program operation, a read operation, etc.). During the execution of certain operations, multiple controller components may be concurrently operational (i.e., active) and consume power from the common power rail in order to perform their respective functions and operations. In this regard, the power consumed via the common power rail coupled to the local media controller and the memory device interface is a sum of the power consumed by all of the active components sharing the common power rail.

The voltage source (e.g., a voltage regulator) which supplies the common power rail is associated with a peak power budget (e.g., a maximum power consumption level) that is used to maintain the voltage and power consumption within desired limits. To meet the higher performance requirements associated with evolving universal flash storage (UFS) technology, the controller components of the memory sub-system are required to perform functionality to enable the concurrent execution of multiple operations (e.g., read operations, write operations, host performance boosting operations, background operations, etc.) in a high speed UFS. This increases the activity and requirements of the controller components powered by the common rail, which can result in an increase in the level of power concurrently consumed by the controller components of the memory sub-system. In certain operating states, multiple controller components may be active and consuming a high level of power at the same time. The parallel consumption of power by multiple components (e.g., hardware components of the controller, the memory device interface, etc.) coupled to a common power rail can cause the power consumed by the local media controller to exceed the peak power budget allocated to the common power rail.

In addition to concurrent activity of multiple controller components, other operating factors can have an impact on the level of power consumed by the controller components coupled to the common power rail. For example, the operating temperature of the memory sub-system can influence the power consumed by the controller components. In this regard, a high operating temperature can cause an increase in the level of power consumed by the multiple concurrently active controller components, which can cause the total power consumption level to exceed the peak power budget.

The voltage source that generates and supplies a voltage level to the common power rail can include a clock source that generates a clock signal corresponding to the voltage supply. The clock signal including a set of clock pulses that are provided to the respective controller components. During operation, the level of power consumed by the respective controller components is based on the frequency of the clock pulses (e.g., a higher frequency of clock pulses is used to provide a higher level of power consumption).

In certain instances, the voltage source (e.g., a voltage regulator) detects that the total power consumed by the multiple controller components exceeds the peak power budget, and the voltage that is supplied to the common power rail is reduced. The reduced voltage level can lead to a loss of functionality of one or more of the controller components. This loss of functionality can cause the memory sub-system to become non-operational.

Aspects of the present disclosure address the above and other deficiencies by controlling a frequency of a clock signal to manage power consumption levels of one or more components of a memory sub-system (e.g., a set of components of the local media controller). According to embodiments, a clock pulse manager manages a clock signal (e.g., a set of clock pulses) generated by a clock source of a voltage source that supplies power to a set of components (e.g., a set of controller components and the memory device interface) coupled to the voltage source via a common power rail. According to embodiments, the clock pulse manager adjusts a frequency of the clock signal that is provided to one or more of the respective controller components by selectively swallowing or dropping one or more clock pulses of the clock signal.

According to embodiments, the clock pulse manager can identify and use information associated with the memory sub-system (herein "power consumption information") to determine power consumption levels associated with the set of controller components of the memory sub-system. In an embodiment, the clock pulse manager can identify information associated with a number of concurrently active controller components, power budget levels corresponding to each of the respective controller components, a total power budget level associated with the set of controller components, and operating temperature information associated with the memory sub-system.

The clock pulse manager can determine if the one or more conditions are satisfied that indicate a consumption of power by the set of controller components exceeds a peak power budget level (referred to as "peak power consumption conditions"). In an embodiment, the clock pulse manager uses at least a portion of the power consumption information to determine if one or more of the peak power consumption conditions are satisfied. In response to the identification of one or more peak power consumption conditions, the clock pulse manager selects one or more controller components of the memory sub-system to receive a clock signal with one or more swallowed or dropped clock pulses. According to embodiments, the swallowing of one or more clock pulses from the clock signal transmitted to one or more controller components can cause the postponing or delaying of one or more activities executed by the corresponding controller component, such that the activities of the multiple controller components do not collide or overlap. Advantageously, the selective clock pulse swallowing enables a reduction of the total power consumption level of the memory sub-system.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IOT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Pillar, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level memory cells (SLC) can store one bit per memory cell. Other types of memory cells, such as multi-level memory cells (MLCs), triple level memory cells (TLCs), quad-level memory cells (QLCs), and penta-level memory cells (PLCs) can store multiple bits per memory cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory page buffers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The local media controllers 135 can implement a clock pulse manager 134 that can manage a frequency of a clock signal provided to one or more controller components of the local media controller 135 by swallowing one or more clock pulses to reduce an overall power level consumed by the set of controller components of the local media controller. In an embodiment, the clock pulse manager 134 manages information associated with the power levels consumed by the respective controller components of the controller and a total power level consumption of the set of controller components. In response to the identification of one or more power consumption events (i.e., the satisfaction of one or more conditions associated with a power consumption level exceeding a power budget level), the clock pulse manager 134 causes one or more clock pulses of a clock signal provided to one or more of the controller components to be swallowed or dropped. The swallowing of one or more clock pulses by the clock pulse manager 134 enables activities of one or more controller components to be delayed or postponed, thereby reducing the overall power consumption level of the set of controller components of the controller.

According to embodiment, the clock pulse manager 134 can identify information relating to the power consumption level associated with the components of the controller. The identified information (i.e., the power consumption information) can include information identifying how many controller components are currently active, which controller components are active, a power consumption level associated with one or more of the controller components, an operating temperature associated with the memory sub-system, etc. The clock pulse manager 134 can maintain one or more data structures or tables including the collected information and one or more threshold levels corresponding to one or more conditions. In an embodiment, the clock pulse manager 134 can compare the collected information to a corresponding threshold level to determine if a condition associated with a peak power consumption event is satisfied. In response to the identification of a peak power consumption condition, the clock pulse manager 134 can cause one or more clock pulses of a clock signal provided to one or more controller components to be swallowed, to reduce the overall power consumption of the controller components of the controller.

Figure 1B:
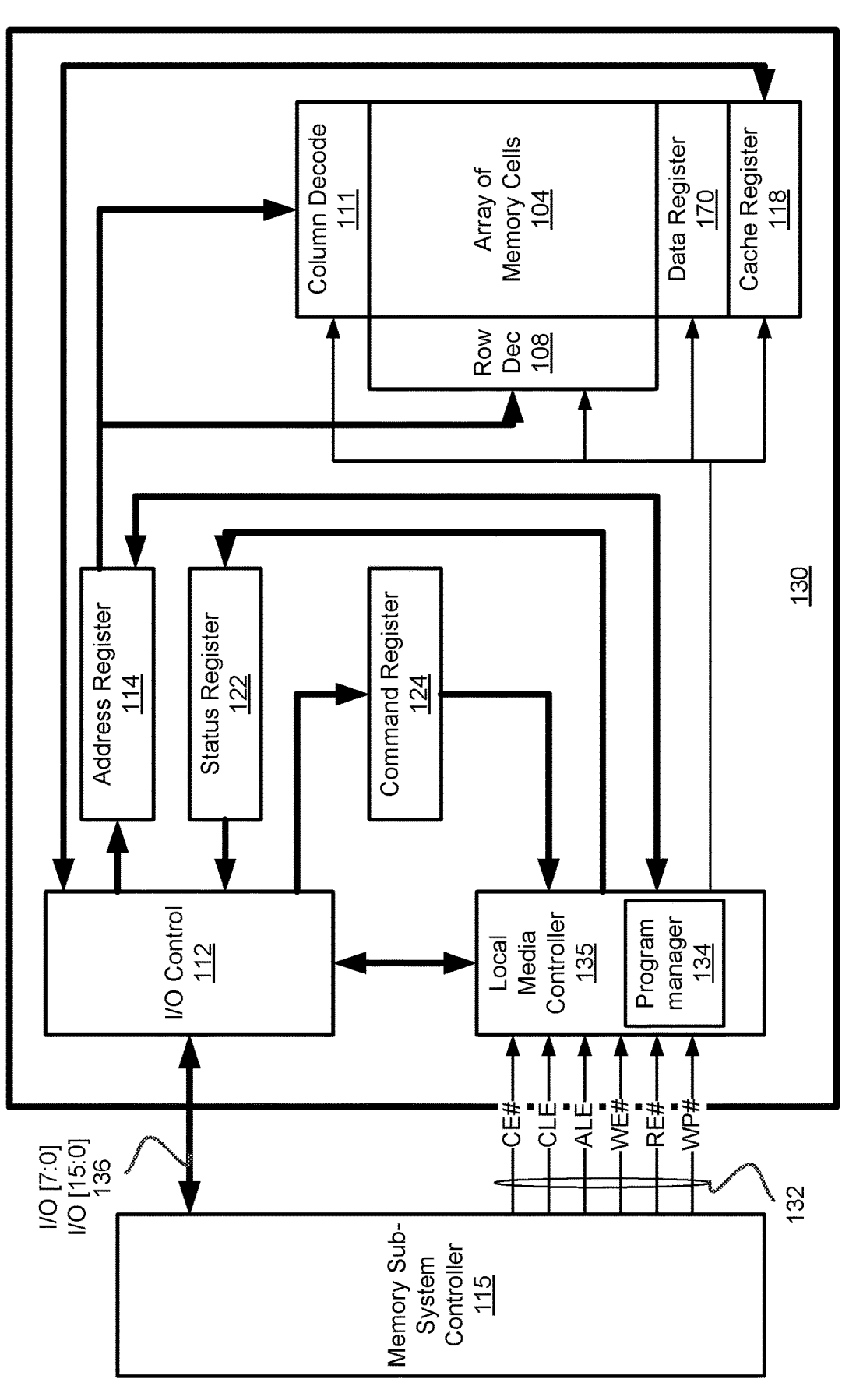
FIG. 1B is a block diagram of a memory device in communication with a memory sub-system controller of a memory sub-system, in accordance with one or more embodiments of the present disclosure.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device.

Memory device 130 includes an array of memory cells 104 logically arranged in rows and columns. Memory cells of a logical row are connected to the same access line (e.g., a wordline) while memory cells of a logical column are selectively connected to the same data line (e.g., a bitline). A single access line may be associated with more than one logical row of memory cells and a single data line may be associated with more than one logical column. Memory cells (not shown in FIG. 1B) of at least a portion of array of memory cells 104 are capable of being programmed to one of at least two target data states.

Row decode circuitry 108 and column decode circuitry 111 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address register 114 (e.g., an address page buffer) is in communication with I/O control circuitry 160 and row decode circuitry 108 and column decode circuitry 111 to latch the address signals prior to decoding. A command register 124 (e.g., a command page buffer) is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 110 to control the row decode circuitry 108 and column decode circuitry 110 in response to the addresses. In one embodiment, local media controller 135 includes the clock pulse manager 134, which can implement the execution of at least a portion of the prologue sub-operations of a programming operation during a data loading stage to reduce a total programming time associated with the programming operation of a set of target memory cells of the memory device 130.

The local media controller 135 is also in communication with a cache register 118 (e.g., a cache page buffer). Cache register 118 latches data, either incoming or outgoing, as directed by the local media controller 135 to temporarily store data while the array of memory cells 104 is busy writing or reading, respectively, other data. During a program operation (e.g., write operation), data may be passed from the cache register 118 to the data register 170 (e.g., a data page buffer) for transfer to the array of memory cells 104; then new data may be latched in the cache register 118 from the I/O control circuitry 160. During a read operation, data may be passed from the cache register 118 to the I/O control circuitry 160 for output to the memory sub-system controller 115; then new data may be passed from the data register 170 to the cache register 118. The cache register 118 and/or the data register 170 may form (e.g., may form a portion of) a page buffer of the memory device 130. A page buffer may further include sensing devices (not shown in FIG. 1B) to sense a data state of a memory cell of the array of memory cells 104, e.g., by sensing a state of a data line connected to that memory cell. A status register 122 (e.g., a status page buffer) may be in communication with I/O control circuitry 160 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 136 and outputs data to the memory sub-system controller 115 over I/O bus 136.

For example, the commands may be received over input/output (I/O) pins [7:0] of I/O bus 136 at I/O control circuitry 160 and may then be written into command page buffer 124. The addresses may be received over input/output (I/O) pins [7:0] of I/O bus 136 at I/O control circuitry 160 and may then be written into address page buffer 114. The data may be received over input/output (I/O) pins [7:0] for an 8-bit device or input/output (I/O) pins [15:0] for a 16-bit device at I/O control circuitry 160 and then may be written into cache register 118. The data may be subsequently written into data register 170 for programming the array of memory cells 104.

In an embodiment, cache register 118 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIGS. 1A-1B has been simplified. It should be recognized that the functionality of the various block components described with reference to FIGS. 1A-1B may not necessarily be segregated to distinct components or component portions of an integrated circuit device. For example, a single component or component portion of an integrated circuit device could be adapted to perform the functionality of more than one block component of FIGS. 1A-1B. Alternatively, one or more components or component portions of an integrated circuit device could be combined to perform the functionality of a single block component of FIGS. 1A-1B. Additionally, while specific I/O pins are described in accordance with popular conventions for receipt and output of the various signals, it is noted that other combinations or numbers of I/O pins (or other I/O node structures) may be used in the various embodiments.

Figure 2A:
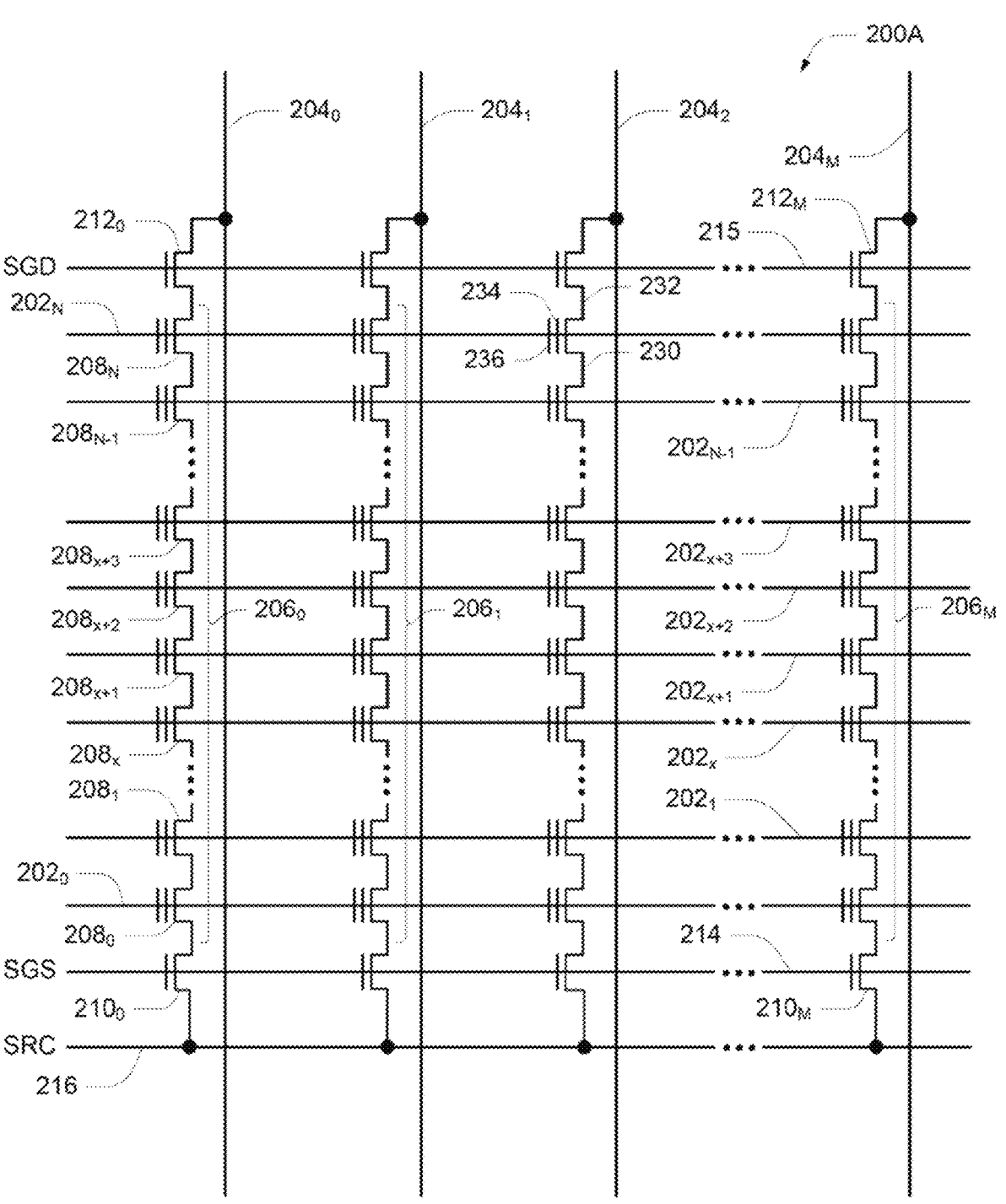
Figure 2B:
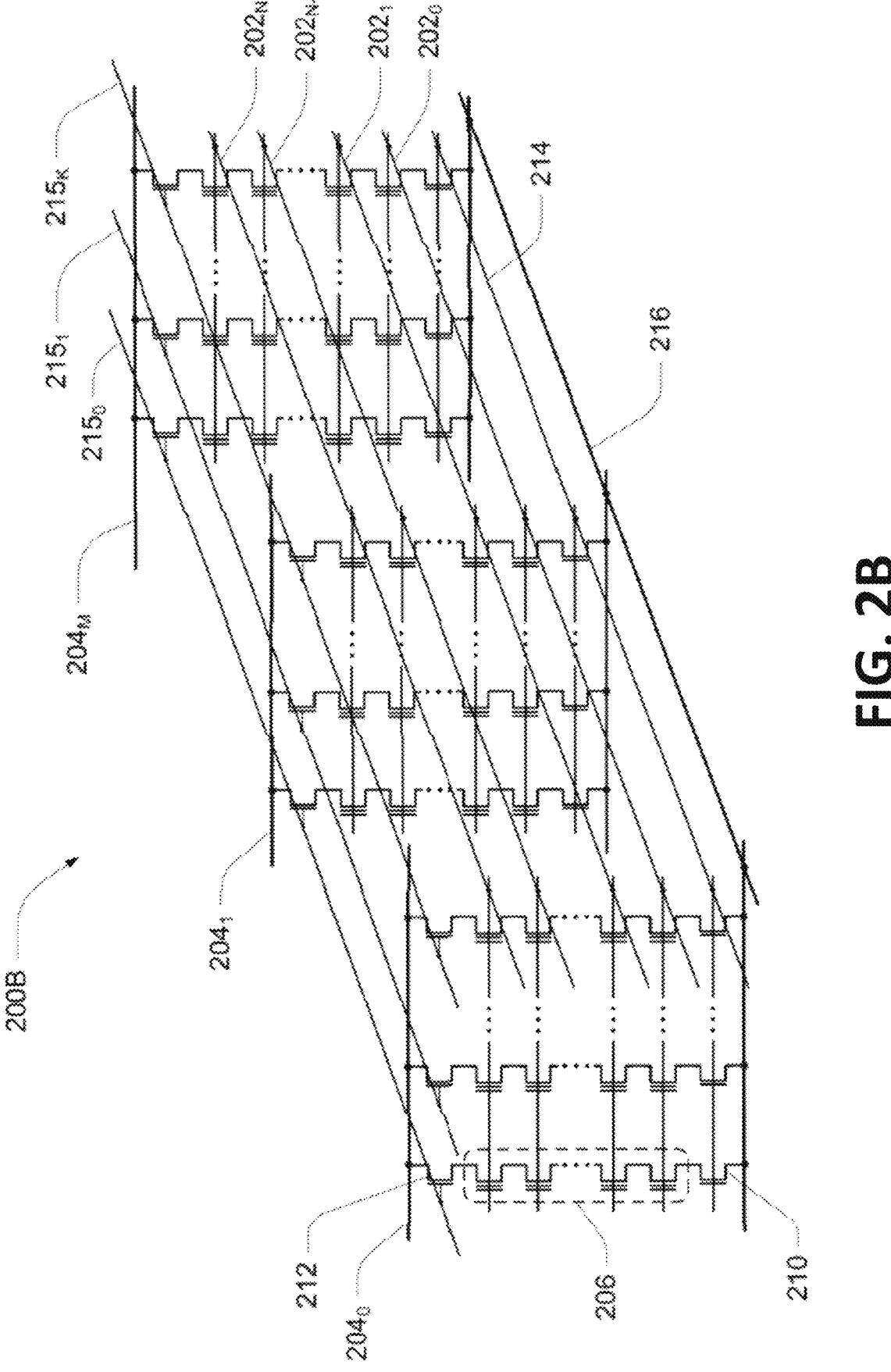
Figure 2C:
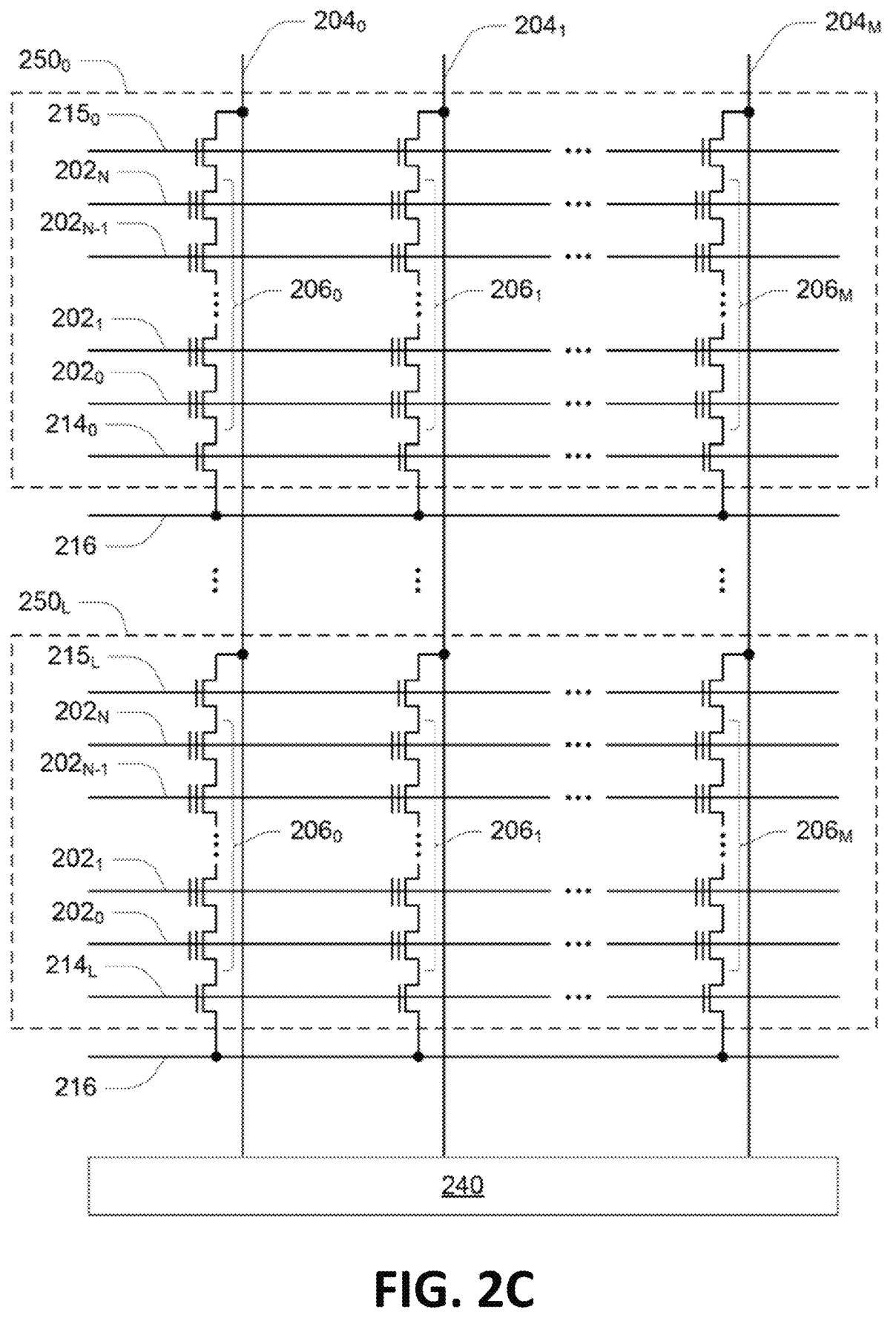

FIGS. 2A-2C are diagrams of portions of an example array of memory cells included in a memory device, in accordance with some embodiments of the present disclosure. For example, FIG. 2A is a schematic of a portion of an array of memory cells 200A as could be used in a memory device (e.g., as a portion of array of memory cells 104). Memory array 200A includes access lines, such as wordlines $202_0$ to $202_N$, and a data line, such as bitline 204. The wordlines 202 may be connected to global access lines (e.g., global wordlines), not shown in FIG. 2A, in a many-to-one relationship. For some embodiments, memory array 200A may be formed over a semiconductor that, for example, may be conductively doped to have a conductivity type, such as a p-type conductivity, e.g., to form a p-well, or an n-type conductivity, e.g., to form an n-well.

Memory array 200A can be arranged in rows each corresponding to a respective wordline 202 and columns each corresponding to a respective bitline 204. Rows of memory cells 208 can be divided into one or more groups of physical pages of memory cells 208, and physical pages of memory cells 208 can include every other memory cell 208 commonly connected a to given wordline 202. For example, memory cells 208 commonly connected to wordline $202_N$ and selectively connected to even bitlines 204 (e.g., bitlines $204_0$, $204_2$, $204_4$, etc.) may be one physical page of memory cells 208 (e.g., even memory cells) while memory cells 208 commonly connected to wordline $202_N$ and selectively connected to odd bitlines 204 (e.g., bitlines $204_1$, $204_3$, $204_5$, etc.) may be another physical page of memory cells 208 (e.g., odd memory cells). Although bitlines $204_3$-$204_5$ are not explicitly depicted in FIG. 2A, it is apparent from the figure that the bitlines 204 of the array of memory cells 200A may be numbered consecutively from bitline $204_0$ to bitline $204_M$. Other groupings of memory cells 208 commonly connected to a given wordline 202 may also define a physical page of memory cells 208. For certain memory devices, all memory cells commonly connected to a given wordline might be deemed a physical page of memory cells. The portion of a physical page of memory cells (which, in some embodiments, could still be the entire row) that is read during a single read operation or programmed during a single programming operation (e.g., an upper or lower page of memory cells) might be deemed a logical page of memory cells. A block of memory cells may include those memory cells that are configured to be erased together, such as all memory cells connected to wordlines $202_0$-$202_N$ (e.g., all strings 206 sharing common wordlines 202). Unless expressly distinguished, a reference to a page of memory cells herein refers to the memory cells of a logical page of memory cells.

Each column can include a string of series-connected memory cells (e.g., non-volatile memory cells), such as one of strings $206_0$ to $206_M$. Each string 206 can be connected (e.g., selectively connected) to a source line 216 (SRC) and can include memory cells $208_0$ to $208_N$. The memory cells 208 of each string 206 can be connected in series between a select gate 210, such as one of the select gates $210_0$ to $210_M$, and a select gate 212, such as one of the select gates $212_0$ to $212_M$. In some embodiments, the select gates $210_0$ to $210_M$ are source-side select gates (SGS) and the select gates $212_0$ to $212_M$ are drain-side select gates. Select gates $210_0$ to $210_M$ can be connected to a select line 214 (e.g., source-side select line) and select gates $212_0$ to $212_M$ can be connected to a select line 215 (e.g., drain-side select line). The select gates 210 and 212 might represent a plurality of select gates connected in series, with each select gate in series configured to receive a same or independent control signal. A source of each select gate 210 can be connected to SRC 216, and a drain of each select gate 210 can be connected to a memory cell $208_0$ of the corresponding string 206. Therefore, each select gate 210 can be configured to selectively connect a corresponding string 206 to SRC 216. A control gate of each select gate 210 can be connected to select line 214. The drain of each select gate 212 can be connected to the bitline 204 for the corresponding string 206. The source of each select gate 212 can be connected to a memory cell $208_N$ of the corresponding string 206. Therefore, each select gate 212 might be configured to selectively connect a corresponding string 206 to the bitline 204. A control gate of each select gate 212 can be connected to select line 215.

In some embodiments, and as will be described in further detail below with reference to FIG. 2B, the memory array in FIG. 2A is a three-dimensional memory array, in which the strings 206 extend substantially perpendicular to a plane containing SRC 216 and to a plane containing a plurality of bitlines 204 that can be substantially parallel to the plane containing SRC 216.

FIG. 2B is another schematic of a portion of an array of memory cells 200B (e.g., a portion of the array of memory cells 104) arranged in a three-dimensional memory array structure. The three-dimensional memory array 200B may incorporate vertical structures which may include semiconductor pillars where a portion of a pillar may act as a channel region of the memory cells of strings 206. The strings 206 may be each selectively connected to a bit line $204_0$-$204_M$ by a select gate 212 and to the SRC 216 by a select gate 210. Multiple strings 206 can be selectively connected to the same bitline 204. Subsets of strings 206 can be connected to their respective bitlines 204 by biasing the select lines $215_0$-$215_L$ to selectively activate particular select gates 212 each between a string 206 and a bitline 204. The select gates 210 can be activated by biasing the select line 214. Each wordline 202 may be connected to multiple rows of memory cells of the memory array 200B. Rows of memory cells that are commonly connected to each other by a particular wordline 202 may collectively be referred to as tiers.

FIG. 2C depicts groupings of NAND strings 206 into blocks of memory cells 250, e.g., blocks of memory cells $250_0$-$250_L$. Blocks of memory cells 250 can be groupings of memory cells 208 that can be erased together in a single erase operation, sometimes referred to as erase blocks. Each block of memory cells 250 can represent those NAND strings 206 commonly associated with a single select line 215, e.g., select line $215_0$. The source 216 for the block of memory cells $250_0$ can be a same source as the source 216 for the block of memory cells $250_L$. For example, each block of memory cells $250_0$-$250_L$, can be commonly selectively connected to the source 216. Access lines 202 and select lines 214 and 215 of one block of memory cells 250 can have no direct connection to access lines 202 and select lines 214 and 215, respectively, of any other block of memory cells of the blocks of memory cells $250_0$-$250_L$.

The bitlines $204_0$-$204_M$ can be connected (e.g., selectively connected) to a buffer portion 240, which can be a portion of the page buffer 152 of the memory device 130. The buffer portion 240 can correspond to a memory plane (e.g., the set of blocks of memory cells $250_0$-$250_L$). The buffer portion 240 can include sense circuits (which can include sense amplifiers) for sensing data values indicated on respective bitlines 204.

Figure 2D:
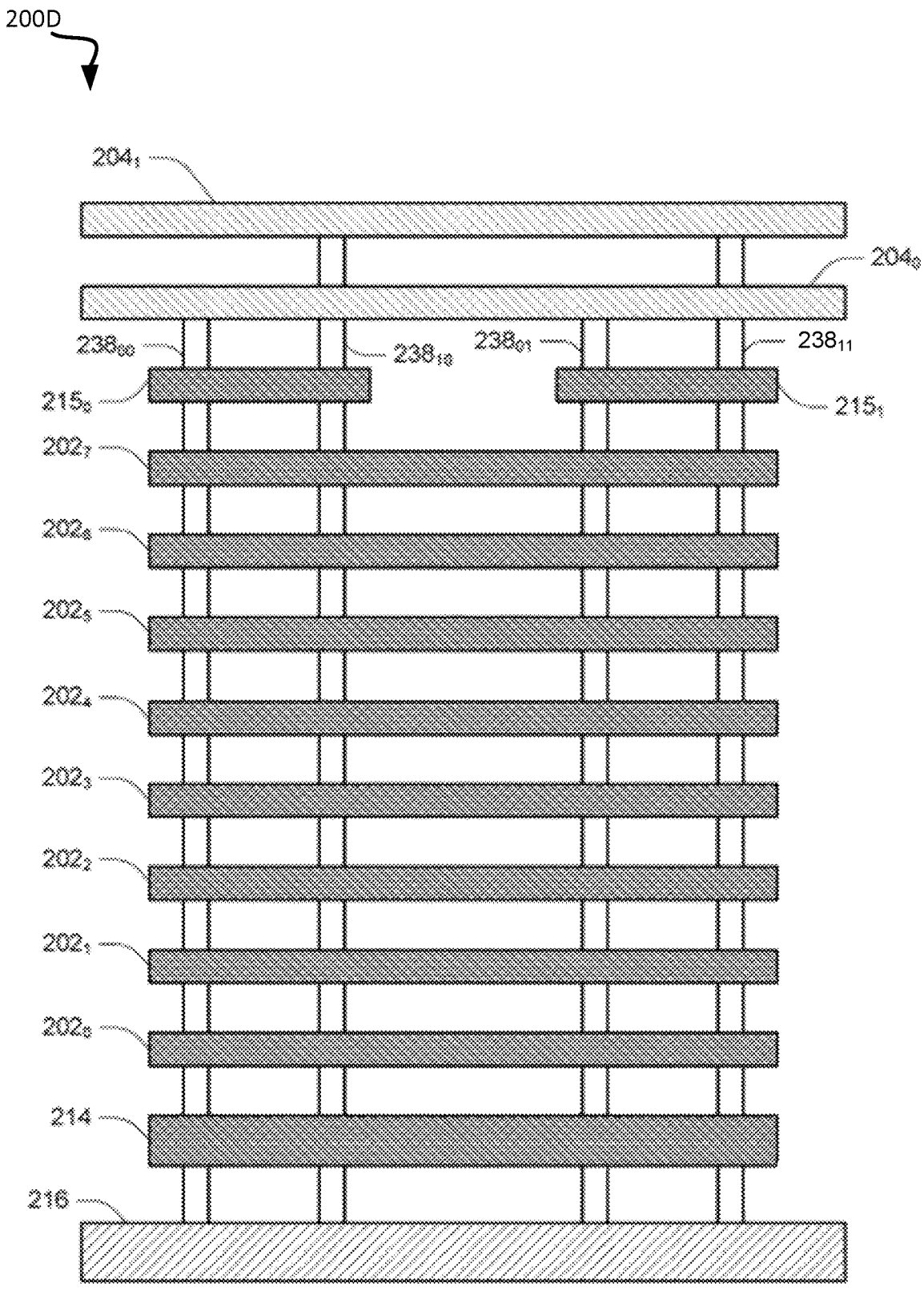

FIG. 2D is a diagram of a portion of an array of memory cells 200D (e.g., a portion of the array of memory cells 104). Channel regions (e.g., semiconductor pillars) $238_{00}$ and $238_{01}$ represent the channel regions of different strings of series-connected memory cells (e.g., strings 206 of FIGS. 2A-2C) selectively connected to the bitline $204_0$. Similarly, channel regions $238_{10}$ and $238_{11}$ represent the channel regions of different strings of series-connected memory cells (e.g., NAND strings 206 of FIGS. 2A-2C) selectively connected to the bitline $204_1$. A memory cell (not depicted in FIG. 2D) may be formed at each intersection of a wordline 202 and a channel region 238, and the memory cells corresponding to a single channel region 238 may collectively form a string of series-connected memory cells (e.g., a string 206 of FIGS. 2A-2C). Additional features might be common in such structures, such as dummy wordlines, segmented channel regions with interposed conductive regions, etc.

FIG. 3 is a block schematic of an example portion of an array of memory cells 300 as could be used in a memory of the type described with reference to FIG. 1B. The array of memory cells 300 is depicted as having four memory planes 350 (e.g., memory planes $350_0$-$350_3$), each in communication with a respective buffer portion 240, which can collectively form a page buffer 352. While four memory planes 350 are depicted, other numbers of memory planes 350 can be commonly in communication with a page buffer 352. Each memory plane 350 is depicted to include L+1 blocks of memory cells 250 (e.g., blocks of memory cells $250_0$-$250_L$).

Figure 4:
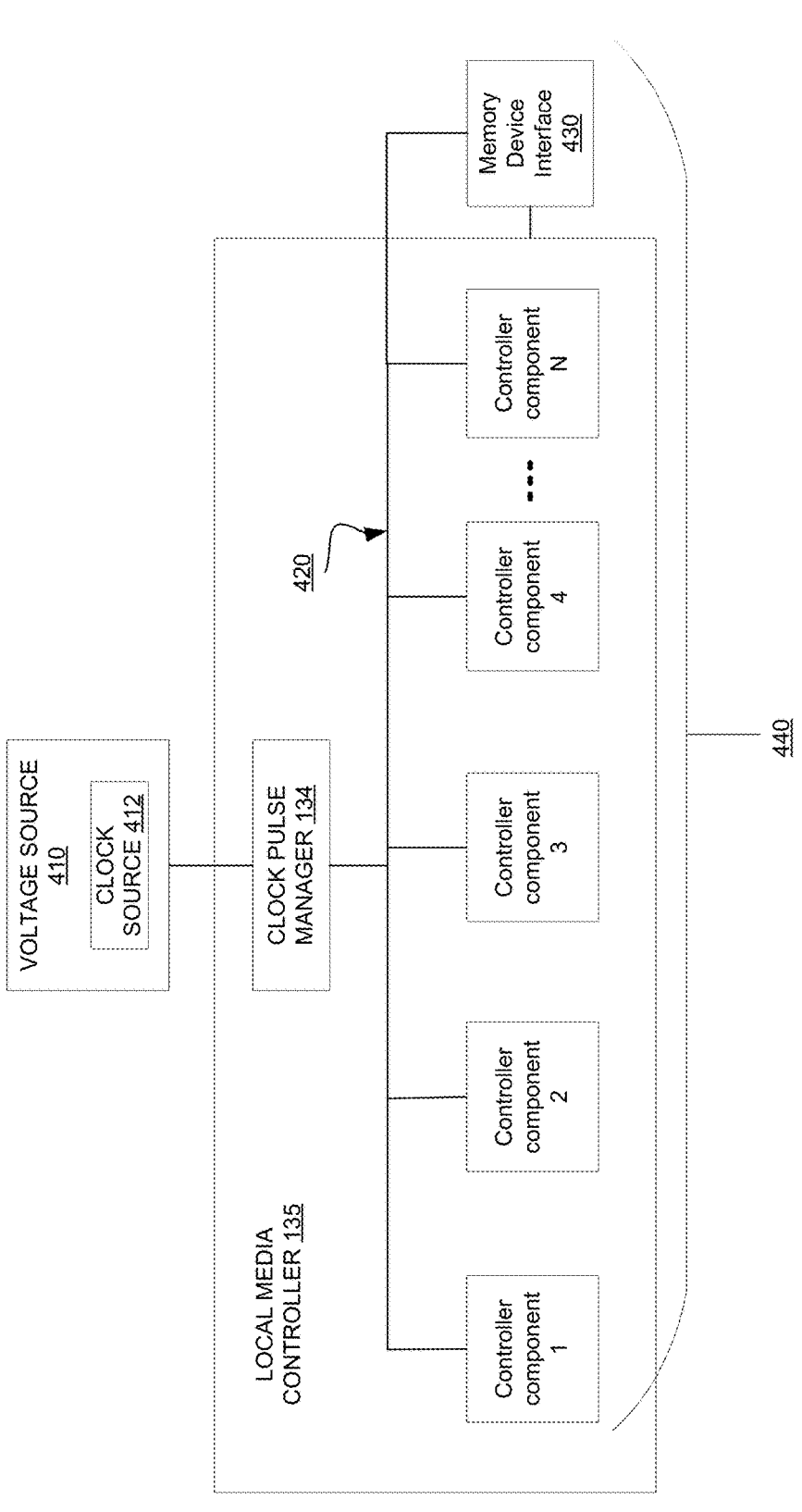
FIG. 4 illustrates an example local media controller including a clock pulse manager that manages the provisioning of clock pulses associated with a voltage source to respective controller components to reduce peak power consumption, in accordance with one or more embodiments of the present disclosure.

FIG. 4 illustrates an example local media controller 135 of a memory sub-system including a clock pulse manager 134 that manages clock pulses of a clock signal provided to a set of controller components (e.g., controller component 1, controller component 2, controller component 3, controller component 4 . . . controller component N) of the local media controller 135. Example controller components include one or more physical interconnect components configured to actively handle read operations and write operations concurrently, one or more core processing devices configured to actively handle read operations and write operations concurrently, one or more static random-access memory devices (e.g., cache memory devices) configured to accommodate and concurrently store read data and write data, one or more flash translation layers including logic for translation and address generation for concurrently executed read operations and write operations, and one or more error correction components providing encoding and decoding functionality relating to read operations and write operations.

As illustrated, the set of controller components of the local media controller 135 and a memory device interface 430 (e.g., an interface configured to actively handle concurrently executed read operations and write operations) are coupled to a voltage source 410 via a common power rail 420. The voltage source 410 includes a clock source 412 to provide a clock signal associated with the supply of voltage to power the set of components 440 (e.g., the controller components and memory device interface 430) via the common power rail 420.

In an embodiment, the clock pulse manager 134 receives the clock signal from the clock source 412 and manages the clock pulses that are provided to the respective components 440 coupled to the power rail 420. In an embodiment, the clock pulse manager 134 identifies, monitors, tracks, collects, etc. information relating to the power consumption level of the set of components 440 (i.e., the power consumption information) and uses the information to determine if one or more power budget conditions is satisfied. In response to the identification of one or more peak power consumption conditions, the clock pulse manager 134 causes one or more clock pulses of the clock signal transmitted to one or more of the components 440 to be swallowed or dropped.

For example, in response to satisfaction of a peak consumption condition (e.g., as a result of the execution of concurrent read operations and write operations by the memory sub-system), the clock pulse manager 134 can select one or more clock pulses of a set of clock pulses that are to be swallowed (i.e., blocked or prevented from transmission to a selected component of the set of components 440). Advantageously, the swallowing of one or more clock pulses by the clock pulse manager 134 results in a reduction in a total power level consumed by the components 440 to enable the memory sub-system to operate within the peak power budget.

Figure 5:
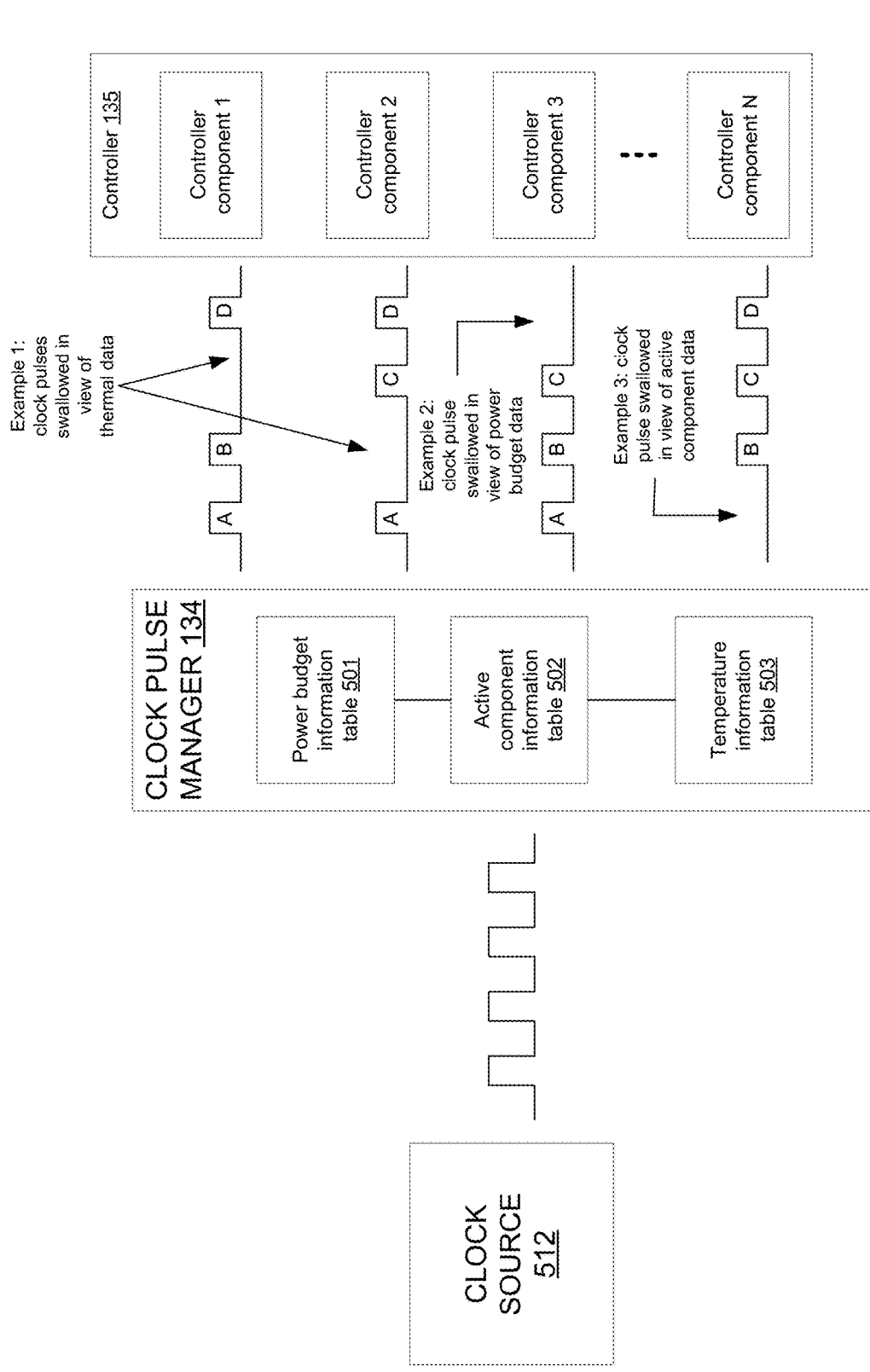
FIG. 5 illustrates examples of selectively swallowing or dropping clock pulses from one or more sets of clock pulses associated with a voltage source that are provided to controller components of a memory sub-system, in accordance with one or more embodiments of the present disclosure.

FIG. 5 illustrates an example clock pulse manager 13 to selectively swallow one or more clock pulses of a clock signal transmitted to one or more components of a local media controller to reduce a peak power level of a memory sub-system. According to embodiments, the clock pulse manager 134 is operatively coupled to a clock source 515 that provides a clock signal including a set of clock pulses. The clock pulse manager 134 maintains one or more data structures to collect, monitor, and store information relating to the power consumption levels associated with the components (e.g., controller component 1, controller component 2, controller component 3 . . . controller component N) of the controller 115. In an embodiment, the one or more data structures (e.g., tables) including respective types of power consumption information and one or more corresponding threshold levels. The clock pulse manager 134 can compare the identified power consumption information to a corresponding threshold level to determine if one or more power budget conditions are satisfied (e.g., power consumption information is greater than or equal to a threshold level, indicating consumption of power that exceeds a power budget level).

As illustrated in FIG. 5, in an embodiment, the clock pulse manager 134 can maintain a first data structure (e.g., power budget information table 501) including information identifying a total power budget level associated with the set of controller components (e.g., a total power budget level for the total or summed power consumption of the set of controller components (e.g., controller components 1 through N) and individual power budget levels (i.e., threshold levels) associated with the respective controller components (e.g., a power budget level for controller component 1, a second power budget level for controller component 2, a third power budget level for controller component 3 . . . an Nth power budget level for controller component N).

In an embodiment, the clock pulse manager 134 can use the information maintained in the first data structure (e.g., power budget information table 501) to compare a power consumption level associated with a controller component (e.g., controller component 1) to a total power budget level (i.e., a threshold level) corresponding to that controller component (e.g., controller component 1) to determine if a power budget condition is satisfied (i.e., determine whether the power consumption level of controller component 1 is greater than or equal to the power budget level of controller component 1).

In an embodiment, the clock pulse manager 134 can use the information stored in the power budget information table 501 to compare a total power consumption level associated with the set of controller components (e.g., controller component 1 through controller component N) to a total power budget level corresponding to the controller 115 (e.g., all of the components that share a common power rail that provides power to the controller components) to determine if a power budget condition is satisfied (i.e., determine whether the total power consumption level of the set of controller components is greater than or equal to the total power budget level associated with the controller 115).

As illustrated in FIG. 5, in an embodiment, the clock pulse manager 134 can maintain a second data structure (e.g., active component information table 501) including information identifying one or more controller components that are concurrently active (e.g., the controller components that are active in parallel during the execution of one or more media access operations). In an embodiment, the active component information table 501 can maintain a threshold level associated with the number of active controller components (e.g., a maximum number of controller components that can be concurrently active). In this example, the clock pulse manager 134 can use the information stored in the active component information table 501 to determine how many controller components are concurrently active and which of the controller components are active. In an embodiment, the clock pulse manager 134 can compare the identified number of active controller components with the threshold active component level to determine if a power budget condition is satisfied (i.e., determine whether the number of active controller components is greater than or equal to the threshold active component level).

As illustrated in FIG. 5, in an embodiment, the clock pulse manager 134 can maintain a third data structure (e.g., temperature information table 503) including information identifying an operating temperature associated with the memory sub-system. In an embodiment, the temperature information table 503 can maintain a threshold temperature level that can be used to compare with a measured temperature level to determine if a power budget condition is satisfied (i.e., determine whether the measured operating temperature is greater than or equal to the threshold temperature level).

In an embodiment, in response to the detection of one or more power budget conditions, the clock pulse manager 134 can swallow or drop one or more clock pulses of one or more clock signals transmitted to one or more of the controller components. In an embodiment, the clock pulse manager 134 can use the collected information and comparisons to corresponding threshold levels to determine if the one or more conditions are satisfied and select the one or more controller components to receive a set of clock pulses with one or more clock pulses swallowed.

FIG. 5 illustrates examples of the swallowing of clock pulses in response to the satisfaction of one or more power budget conditions. In example 1, the clock pulse manager 134 determines that the operating temperature of the memory sub-system exceeds the temperature threshold level during the execution of one or more media access operations where controller component 1 and controller component 2 are concurrently active, thereby satisfying a power budget condition (i.e., the temperature-based condition). In response to the satisfaction of the condition, the clock pulse manager swallows or drops clock pulse C from the clock signal transmitted to controller component 1 and swallows clock pulse B from the clock signal transmitted to controller component 2. Advantageously, the swallowing of the clock pulses in this example results in a reduction of the total power consumed by the set of controller components.

As illustrated, the clock pulse manager 134 can select which clock pulses to swallow and the particular controller components to receive the adjusted clock signal frequency to manage the activity and power consumption of the respective controller components. In this regard, controller component 1 consumes a lower level of power due to the swallowing of clock pulse C and controller component 2 consumes a lower level of power due to the swallowing of clock pulse B, thereby reducing the total power consumption level of the controller 115. In an embodiment, the clock pulse manager 134 can select different clock pulses to be swallowed in the different distributions of the clock signal (e.g., clock pulse C from controller component 1 and clock pulse B from controller component 2) to optimize the reduction in the overall power consumption level.

In example 2, the clock pulse manager 134 determines that a total power consumption level associated with the set of controller components during the execution of one or more media access operations exceeds a total power budget threshold level. In response to the satisfaction of this power budget condition, the clock pulse manager 134 swallows clock pulse D from the clock signal transmitted to controller component 3.

In example 3, the clock pulse manager 134 determines that a total number of active controller components during the execution of one or more media access operations exceeds a total threshold level of active components (e.g., a maximum allowed number of active components). In response to the satisfaction of this power budget condition, the clock pulse manager 134 swallows clock pulse A from the clock signal transmitted to controller component N.

In an embodiment, the clock pulse manager 134 can select controller component N to receive the adjusted clock signal with the adjusted frequency in view of information relating to a current power consumption level of that controller component. For example, the clock pulse manager 134 can compare a current power consumption level of each of the controller components and identify a highest power consumption level (i.e., using information stored in the power budget information table 501). In response the clock pulse manager 134 can adjust the frequency of the clock signal by swallowing clock pulse A for the controller component having a highest relative power consumption level (e.g., controller component N in example 3 illustrated in FIG. 5).

According to embodiments, the examples shown in FIG. 5 can be performed independently or in any combination. For example, in response to the satisfaction of multiple power budget conditions, the clock pulse swallowing shown in examples 1 and 2 can be performed concurrently. In another example, in response to the satisfaction of multiple power budget conditions, the clock pulse swallowing shown in examples 1, 2, and 3 can be performed concurrently, and so on.

FIG. 6 is a flow diagram of an example method 600 to manage clock pulses of a clock signal transmitted to a set of components of a local media controller, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the clock pulse manager 134 of FIGS. 1A-1B, 4 and 5. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, information is identified. For example, processing logic (e.g., the clock pulse manager 134 of FIGS. 1A-1B, 4 and 5) can identify information associated with a power consumption level of a set of components of a local media controller of a memory sub-system. In an embodiment, the information can include data associated with power consumption levels of one or more of the components of the local media controller. For example, the information can include a number of active controller components, a power consumption level associated with the respective controller components, an operating temperature associated with the memory sub-system, etc. In an embodiment, the identified power consumption information can be stored in one or more data structures (e.g., data structures 501, 502, and 503 of FIG. 5).

At operation 620, a determination is made. For example, the processing logic can determine whether the information associated with the power consumption level satisfies one or more conditions. In an embodiment, the processing logic can compare the information to one or more threshold levels to determine if a condition is satisfied. The power budget conditions can include a first condition relating to the power consumption level of one or more controller components, a second condition relating to a number of active controller components, and a third condition relating to an operating temperature of the memory sub-system, as described in detail above. In an embodiment, the one or more conditions are satisfied in response to a comparison of the identified power consumption information and one or more threshold levels (e.g., a power budget level, an active component threshold level, or an operating temperature threshold level).

At operation 630, an action is performed. For example, in response to the one or more conditions being satisfied, the processing logic swallow one or more clock pulses of a clock signal (e.g., drop one or more clock pulses from the clock signal) transmitted to at least one component of the set of components of the local media controller. In an embodiment, the processing logic can select the one or more components that are to receive an adjusted clock signal that includes one or more swallowed or dropped clock pulses. In an embodiment, the processing logic selects the one or more clock pulses that are to be swallowed based on the identified power budget information and the comparisons with the one or more threshold levels.

Figure 7:
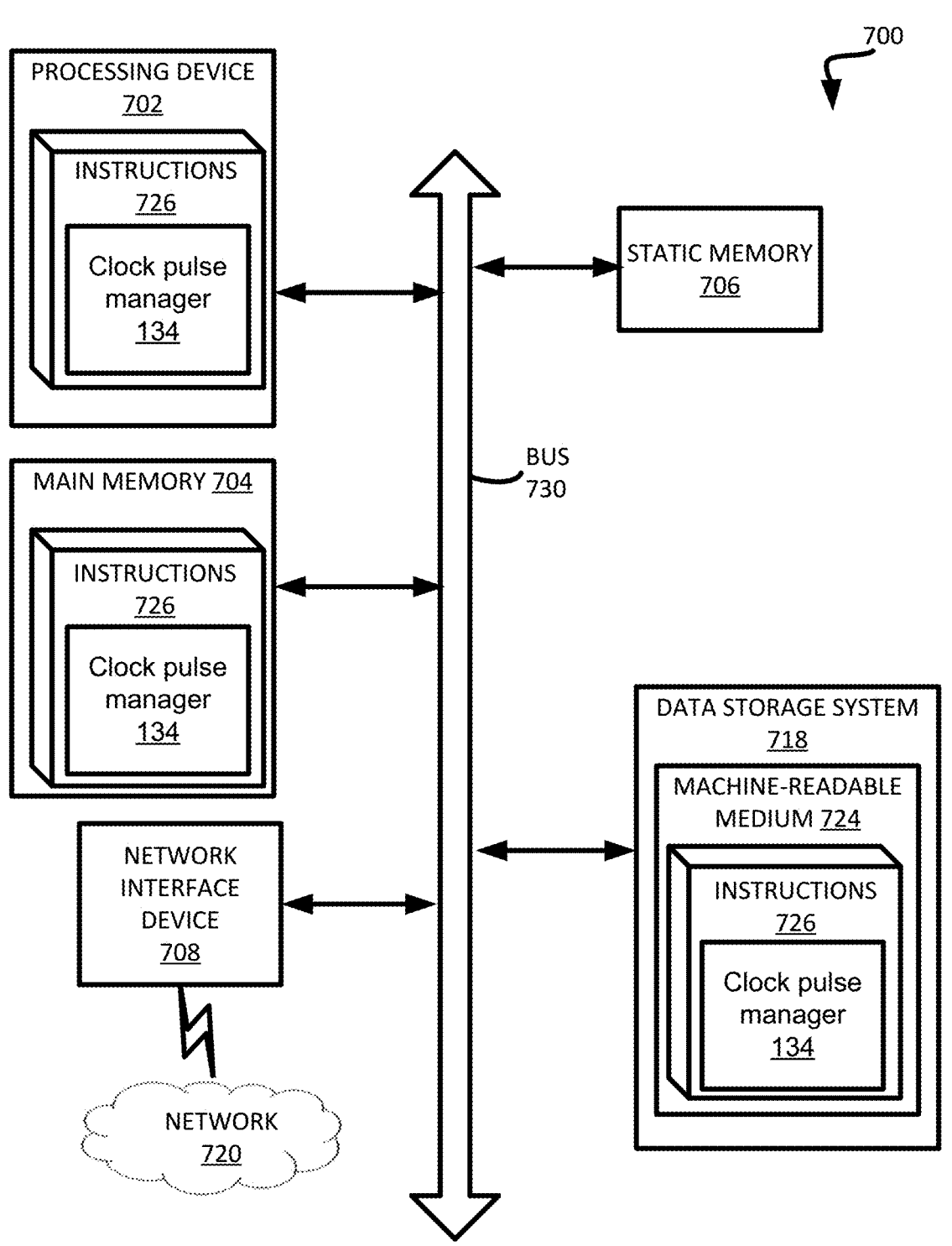
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1A) that includes, is coupled to, or utilizes a memory sub-system (e.g., the memory sub-system 110 of FIG. 1A) or can be used to perform the operations of a controller (e.g., to execute an operating system to perform operations corresponding to the clock pulse manager 134 of FIGS. 1A, 1B, 4 and 5). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a memory cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or RDRAM, etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1A.

In one embodiment, the instructions 726 include instructions to implement functionality corresponding to a program manager (e.g., the clock pulse manager 134 of FIG. 1A and FIG. 1B). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's page buffers and memories into other data similarly represented as physical quantities within the computer system memories or page buffers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled to the memory device, to perform operations comprising:
  identifying first information comprising an operating temperature associated with a first power consumption level of a first component of a controller of the memory device;
  determining that the first information satisfies a first condition, wherein the first condition is satisfied when the operating temperature is greater than or equal to a threshold temperature level;
  in response to the first condition being satisfied, swallowing one or more clock pulses of a first clock signal transmitted to the first component of the controller;

identifying second information comprising a power consumption level associated with a second component of the controller of the memory device;
  determining that the second information satisfies a second condition, wherein the second condition is satisfied when the power consumption level is greater than or equal to a threshold power consumption level; and
  in response to the second condition being satisfied, swallowing one or more clock pulses of a second clock signal transmitted to the second component of the controller, wherein a third component of the controller receives an unadjusted third clock signal.

2. The system of claim 1, wherein the swallowing of the one or more clock pulses of the first clock signal comprises:
  a first swallowing of a first clock pulse of the first clock signal transmitted to the first component of the controller; and
  a second swallowing of a second clock pulse of the first clock signal transmitted to the first component of the controller.

3. The system of claim 1, wherein a plurality of clock pulses of the first clock signal are swallowed.

4. The system of claim 1, wherein the swallowing of the one or more clock pulses of the first clock signal reduces a total power consumption level associated with the first component of the controller.

5. A method comprising:
  identifying first information comprising an operating temperature associated with a first power consumption level of a first component of a controller of a memory device;
  determining that the first information satisfies a first condition, wherein the first condition is satisfied when the operating temperature is greater than or equal to a threshold temperature level;
  in response to the first condition being satisfied, swallowing one or more clock pulses of a first clock signal transmitted to the first component of the controller;
  identifying second information comprising a power consumption level associated with a second component of the controller of the memory device;
  determining that the second information satisfies a second condition, wherein the second condition is satisfied when the power consumption level is greater than or equal to a threshold power consumption level; and
  in response to the second condition being satisfied, swallowing one or more clock pulses of a second clock signal transmitted to the second component of the controller, wherein a third component of the controller receives an unadjusted third clock signal.

6. The method of claim 5, wherein the swallowing of the one or more clock pulses of the first clock signal comprises:
  a first swallowing of a first clock pulse of the first clock signal transmitted to the first component of the controller; and
  a second swallowing of a second clock pulse of the first clock signal transmitted to the first component of the controller.

7. The method of claim 5, wherein a plurality of clock pulses of the first clock signal are swallowed.

8. The method of claim 5, wherein the swallowing of the one or more clock pulses of the first clock signal reduces a total power consumption level associated with the first component of the controller.

9. A non-transitory computer readable medium comprising instructions, which when executed by a processing device, cause the processing device to perform operations comprising:

identifying first information comprising an operating temperature associated with a first power consumption level of a first component of a controller of a memory device;

determining that the first information satisfies a first condition, wherein the first condition is satisfied when the operating temperature is greater than or equal to a threshold temperature level;

in response to the first condition being satisfied, swallowing one or more clock pulses of a first clock signal transmitted to the first component of the controller;

identifying second information comprising a power consumption level associated with a second component of the controller of the memory device;

determining that the second information satisfies a second condition, wherein the second condition is satisfied when the power consumption level is greater than or equal to a threshold power consumption level; and in response to the second condition being satisfied, swallowing one or more clock pulses of a second clock signal transmitted to the second component of the controller, wherein a third component of the controller receives an unadjusted third clock signal.

10. The non-transitory computer readable medium of claim 9, wherein the swallowing of the one or more clock pulses of the first clock signal comprises:

a first swallowing of a first clock pulse of the first clock signal transmitted to the first component of the controller; and a second swallowing of a second clock pulse of the first clock signal transmitted to the first component of the controller.

11. The non-transitory computer readable medium of claim 9, wherein the swallowing of the one or more clock pulses of the first clock signal reduces a total power consumption level associated with the first component of the controller.

\* \* \* \* \*